US012748653B2

(12) United States Patent
Dong et al.

(10) Patent No.: US 12,748,653 B2
(45) Date of Patent: Sep. 29, 2026

(54) CORRECTION DATA DETERMINATION APPARATUS, CORRECTION DATA DETERMINATION METHOD, AND STORAGE MEDIUM

(71) Applicant: NEC Corporation, Tokyo (JP)

(72) Inventors: Yuyang Dong, Tokyo (JP); Masafumi Enomoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 18/864,942

(22) PCT Filed: May 18, 2022

(86) PCT No.: PCT/JP2022/020610
§ 371 (c)(1),
(2) Date: Nov. 12, 2024

(87) PCT Pub. No.: WO2023/223448
PCT Pub. Date: Nov. 23, 2023

(65) Prior Publication Data
US 2025/0335291 A1 Oct. 30, 2025

(51) Int. Cl.
*G06F 11/07* (2006.01)

(52) U.S. Cl.
CPC ...... *G06F 11/0793* (2013.01); *G06F 11/0727* (2013.01)

(58) Field of Classification Search
CPC . G06F 11/0793; G06F 11/0727; G06F 16/215
USPC .......................................................... 714/746
See application file for complete search history.

(56) References Cited

U.S. PATENT DOCUMENTS

| | | | | |
|---|---|---|---|---|
| 2020/0104651 | A1* | 4/2020 | Jones | G06F 11/3447 |
| 2020/0210856 | A1* | 7/2020 | Vengalayapalli Kichagari | G06Q 40/03 |
| 2021/0192392 | A1* | 6/2021 | Oki | G06N 20/00 |
| 2022/0277222 | A1* | 9/2022 | Shirahata | G06N 3/09 |

FOREIGN PATENT DOCUMENTS

| | | | |
|---|---|---|---|
| CN | 109146141 | A | 1/2019 |
| CN | 112420187 | A | 2/2021 |
| CN | 113537415 | A | 10/2021 |
| JP | 2013-175096 | A | 9/2013 |
| JP | 2015-165435 | A | 9/2015 |
| JP | 2018-190195 | A | 11/2018 |

(Continued)

OTHER PUBLICATIONS

International Search Report for PCT Application No. PCT/JP2022/020610, mailed on Aug. 9, 2022.

*Primary Examiner* — Esaw T Abraham
*Assistant Examiner* — Osman M Alshack

(57) ABSTRACT

To enable appropriate error correction that suits an analysis task, an information processing apparatus (1) includes: an acquisition unit (11) that acquires target data; a calculation unit (12) that calculates, for respective ones of a plurality of errors included in the target data or for respective ones of attributes of the plurality of errors, corresponding degrees of influence that the respective ones of the plurality of errors exert on an evaluation index of a machine learning model; and a determination unit (13) that determines data to be corrected in the target data on the basis of the degrees of influence calculated by the calculation unit (12).

10 Claims, 7 Drawing Sheets

(56) References Cited

FOREIGN PATENT DOCUMENTS

| | | | |
|---|---|---|---|
| JP | 2020-201890 | A | 12/2020 |
| JP | 2021-144619 | A | 9/2021 |
| JP | 2021-174194 | A | 11/2021 |
| WO | 2018/207506 | A1 | 11/2018 |

* cited by examiner

FIG. 5

D E1 E2 E3 E4 E5

| Id | Name | Prefecture | Postal code | Age | Annual income |
|---|---|---|---|---|---|
| 1 | Dong | Kanagawa | 224-0023 | 300 | 40.0 |
| 2 | Taro | ? | 1070052 | 23 | 500 |
| 3 | Hanako | Tokyo | 305-0021 | 45 | 700 |

FIG. 6

D E1 E2 E3 E4 E5 $g_1$ $g_2$ $g_3$ $g_4$

| Id | Name | Prefecture | Postal code | Age | Annual income |
|---|---|---|---|---|---|
| 1 | Dong | Kanagawa | 224-0023 | 300 | 40.0 |
| 2 | Taro | ? | 1070052 | 23 | 500 |
| 3 | Hanako | Tokyo | 305-0021 | 45 | 700 |

FIG. 7

D

| Id | Name | Prefecture | Postal code | Age | Annual income |
|---|---|---|---|---|---|
| 1 | Dong | Kanagawa | 224-0023 | 300 | 40.0 |
| 2 | Taro | ? | 1070052 | 23 | 500 |
| 3 | Hanako | Tokyo | 305-0021 | 45 | 700 |

$g_1$ [points to the "?" Prefecture cell of Id 2]

$D_1'$

| Id | Name | Prefecture | Postal code | Age | Annual income |
|---|---|---|---|---|---|
| 1 | Dong | ? | 224-0023 | 300 | 40.0 |
| 2 | Taro | ? | 1070052 | 23 | 500 |
| 3 | Hanako | Tokyo | 305-0021 | 45 | 700 |

E11 [points to the Prefecture cell of Id 1]

D

| Id | Name | Prefecture | Postal code | Age | Annual income |
|---|---|---|---|---|---|
| 1 | Dong | Kanagawa | 224-0023 | 300 | 40.0 |
| 2 | Taro | ? | 1070052 | 23 | 500 |
| 3 | Hanako | Tokyo | 305-0021 | 45 | 700 |

$g_2$ [points to the Postal code cell of Id 2]

$D_2'$

| Id | Name | Prefecture | Postal code | Age | Annual income |
|---|---|---|---|---|---|
| 1 | Dong | Kanagawa | 2240023 | 300 | 40.0 |
| 2 | Taro | ? | 1070052 | 23 | 500 |
| 3 | Hanako | Tokyo | 305-0021 | 45 | 700 |

E12 [points to the Postal code column]

…

D

| Id | Name | Prefecture | Postal code | Age | Annual income |
|---|---|---|---|---|---|
| 1 | Dong | Kanagawa | 224-0023 | 300 | 40.0 |
| 2 | Taro | ? | 1070052 | 23 | 500 |
| 3 | Hanako | Tokyo | 305-0021 | 45 | 700 |

r1 r2 r3

D

| Id | Name | Prefecture | Postal code | Age | Annual income | |
|---|---|---|---|---|---|---|
| 1 | Dong | Kanagawa | 224-0023 | 300 | 40.0 | r1 |
| 2 | Taro | ? | 1070052 | 23 | 500 | r2 |
| 3 | Hanako | Tokyo | 305-0021 | 45 | 700 | r3 |

$D_{clean}$

| Id | Name | Prefecture | Postal code | Age | Annual income | |
|---|---|---|---|---|---|---|
| 1 | Dong | Kanagawa | 224-0023 | 30 | 400 | $r1_{clean}$ |
| 2 | Taro | ? | 1070052 | 23 | 500 | r2 |
| 3 | Hanako | Tokyo | 305-0021 | 45 | 700 | r3 |

CORRECTION DATA DETERMINATION APPARATUS, CORRECTION DATA DETERMINATION METHOD, AND STORAGE MEDIUM

This application is a National Stage Entry of PCT/JP2022/020610 filed on May 18, 2022, the contents of all of which are incorporated herein by reference, in their entirety.

TECHNICAL FIELD

The present invention relates to a technique for analyzing data.

BACKGROUND ART

In data analysis, the quality of data becomes a problem. Here, cases in which the quality of data becomes a problem include, for example, "nonuniform description", "missing value", "anomalous value", "format deviation", and the like. For example, Patent Literature 1 discloses the so-called data cleansing technology for correcting an error or the like included in data. Patent Literature 1 describes, as a technique for appropriately handling data inconsistency between operation systems to enable high-accuracy data analysis, specifying details of a data cleansing process on the basis of deviation of object-related operation data between the operation systems and carrying out the data cleansing process with the specified details.

CITATION LIST

Patent Literature

[Patent Literature 1]
International Publication No. WO 2018/207506

SUMMARY OF INVENTION

Technical Problem

However, in data cleansing, it is known that an error to be corrected differs depending on the type of analysis task in machine learning. In the technique described in Patent Literature 1, there is a problem that error correction allowing for an analysis task cannot be carried out.

An example aspect of the present invention has been made in view of the above problem, and an example of an object thereof is to enable appropriate error correction that suits an analysis task.

Solution to Problem

A correction data determination apparatus in accordance with an example aspect of the present invention includes: at least one processor, the at least one processor carrying out: an acquisition process for acquiring target data; a calculation process for calculating, for respective ones of a plurality of errors included in the target data or for respective ones of attributes of the plurality of errors, corresponding degrees of influence that the respective ones of the plurality of errors exert on an evaluation index of a machine learning model; and a determination process for determining data to be corrected in the target data on the basis of the degrees of influence calculated in the calculation process.

A correction data determination method in accordance with an example aspect of the present invention includes: acquiring target data; calculating, for respective ones of a plurality of errors included in the target data or for respective ones of attributes of the plurality of errors, corresponding degrees of influence that the respective ones of the plurality of errors exert on an evaluation index of a machine learning model; and determining data to be corrected in the target data on the basis of the calculated degrees of influence.

A storage medium in accordance with an example aspect of the present invention is a computer-readable non-transitory storage medium storing a program for causing a computer to function as a correction data determination apparatus, the program causing the computer to carry out: an acquisition process for acquiring target data; a calculation process for calculating, for respective ones of a plurality of errors included in the target data or for respective ones of attributes of the plurality of errors, corresponding degrees of influence that the respective ones of the plurality of errors exert on an evaluation index of a machine learning model; and a determination process for determining data to be corrected in the target data on the basis of the degrees of influence calculated in the calculation process.

Advantageous Effects of Invention

According to an example aspect of the present invention, it is possible to carry out appropriate error correction that suits an analysis task.

BRIEF DESCRIPTION OF DRAWINGS

FIG. 5 is a view illustrating a specific example of errors detected by an error detection unit in accordance with the second example embodiment.

FIG. 6 is a view illustrating a specific example of grouping of errors by a grouping unit in accordance with the second example embodiment.

FIG. 7 is a view illustrating a specific example of evaluation data generated by an evaluation data generation unit in accordance with the second example embodiment.

DESCRIPTION OF EMBODIMENTS

First Example Embodiment

A first example embodiment of the present invention will be described in detail with reference to the drawings. The present example embodiment is a basic form of an example embodiment described later.

(Configuration of Information Processing Apparatus)

Figure 1:
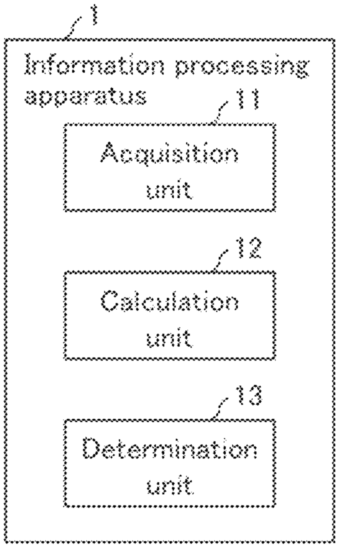
FIG. 1 is a block diagram illustrating a configuration of an information processing apparatus in accordance with a first example embodiment.

A configuration of an information processing apparatus 1 in accordance with the present example embodiment will be described with reference to FIG. 1. FIG. 1 is a block diagram illustrating the configuration of the information processing apparatus 1. The information processing apparatus 1 includes an acquisition unit 11, a calculation unit 12, and a determination unit 13.

The acquisition unit 11 acquires target data. The calculation unit 12 calculates, for respective ones of a plurality of errors included in the target data or for respective ones of attributes of the plurality of errors, corresponding degrees of influence that the respective ones of the plurality of errors exert on an evaluation index of a machine learning model. The determination unit 13 determines data to be corrected in the target data on the basis of the degrees of influence calculated by the calculation unit 12.

As described above, the information processing apparatus 1 in accordance with the present example embodiment employs the configuration of including: the acquisition unit 11 that acquires target data; the calculation unit 12 that calculates, for respective ones of a plurality of errors included in the target data or for respective ones of attributes of the plurality of errors, corresponding degrees of influence that the respective ones of the plurality of errors exert on an evaluation index of a machine learning model; and the determination unit 13 that determines data to be corrected in the target data on the basis of the degrees of influence calculated by the calculation unit 12. Thus, according to the information processing apparatus 1 in accordance with the present example embodiment, it is possible to provide an example advantage of being capable of carrying out appropriate error correction that suits an analysis task.

(Information Processing Program)

The functions of the information processing apparatus 1 described above can also be realized by a program. An information processing program in accordance with the present example embodiment causes a computer to function as an acquisition means for acquiring target data; a calculation means for calculating, for respective ones of a plurality of errors included in the target data or for respective ones of attributes of the plurality of errors, corresponding degrees of influence that the respective ones of the plurality of errors exert on an evaluation index of a machine learning model; and a determination means for determining data to be corrected in the target data on the basis of the degrees of influence calculated by the calculation means.

(Flow of Information Processing Method)

Figure 2:
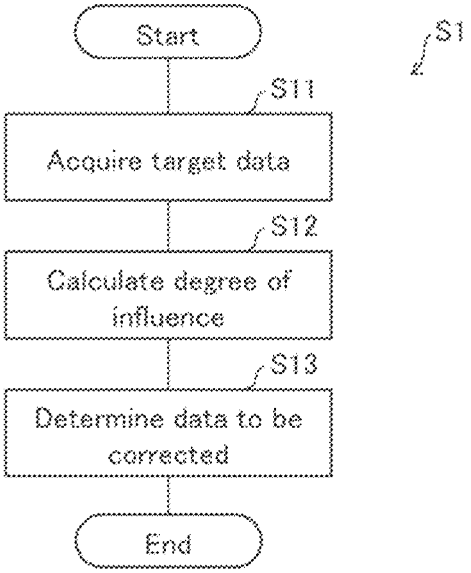
FIG. 2 is a flowchart illustrating a flow of an information processing method in accordance with the first example embodiment.

A flow of an information processing method S1 in accordance with the present example embodiment will be described with reference to FIG. 2. FIG. 2 is a flowchart illustrating the flow of the information processing method S1. It should be noted that steps of the information processing method S1 may be carried out by a processor included in the information processing apparatus 1 or by a processor included in another apparatus. Alternatively, the steps may be carried out by processors provided in respective different apparatuses.

In step S11, at least one processor acquires target data. In step S12, at least one processor calculates, for respective ones of a plurality of errors included in the target data or for respective ones of attributes of the plurality of errors, corresponding degrees of influence that the respective ones of the plurality of errors exert on an evaluation index of a machine learning model. In step S13, at least one processor determines data to be corrected in the target data on the basis of the degrees of influence calculated in step S12.

As described above, the information processing method S1 in accordance with the present example embodiment employs the configuration of including: at least one processor acquiring target data which is an evaluation target; the at least one processor calculating, for respective ones of a plurality of errors included in the target data or for respective ones of types of attributes of the plurality of errors, corresponding degrees of influence that the respective ones of the plurality of errors exert on an evaluation index of a machine learning model; and the at least one processor determining data to be corrected in the target data on the basis of the calculated degrees of influence. Thus, according to the information processing method S1 in accordance with the present example embodiment, it is possible to provide an example advantage of being capable of carrying out appropriate error correction that suits an analysis task.

Second Example Embodiment

A second example embodiment of the present invention will be described in detail with reference to the drawings. The same reference numerals are given to constituent elements which have functions identical with those described in the first example embodiment, and descriptions as to such constituent elements are not repeated.

<Configuration of Information Processing Apparatus>

Figure 3:
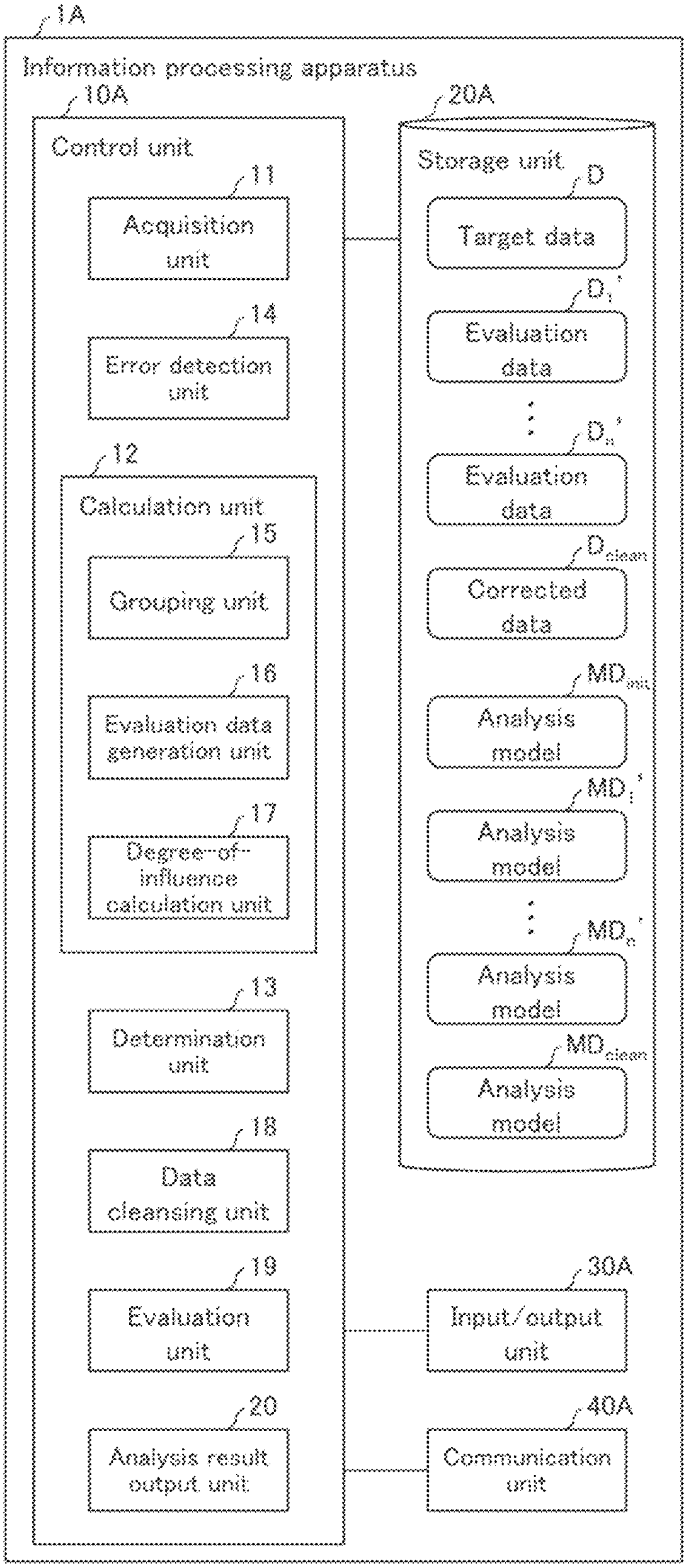
FIG. 3 is a block diagram illustrating a configuration of an information processing apparatus in accordance with a second example embodiment.

FIG. 3 is a block diagram illustrating a configuration of an information processing apparatus 1A in accordance with the second example embodiment. The information processing apparatus 1A includes a control unit 10A, a storage unit 20A, an input/output unit 30A, and a communication unit 40A.

(Input/Output Unit)

To the input/output unit 30A, input/output apparatuses such as a keyboard, a mouse, a display, a printer, and a touch panel are connected. The input/output unit 30A receives input of various kinds of information with respect to the information processing apparatus 1A from an input apparatus connected thereto. Further, the input/output unit 30A outputs, under control of the control unit 10A, various kinds of information to an output apparatus connected thereto. Examples of the input/output unit 30A include an interface such as a universal serial bus (USB). Further, the input/output unit 30A may include a display panel, a speaker, a keyboard, a mouse, a touch panel, and/or the like.

(Communication Unit)

The communication unit 40A communicates with an apparatus outside the information processing apparatus 1A via a communication line. A specific configuration of the communication line is not intended to limit the present example embodiment. The communication line is, for example, a wireless local area network (LAN), a wired LAN, a wide area network (WAN), a public network, a mobile data communication network, or a combination of these networks. The communication unit 40A transmits, to another apparatus, data supplied from the control unit 10A and supplies, to the control unit 10A, data received from another apparatus.

(Control Unit)

The control unit 10A includes an acquisition unit 11, a calculation unit 12, a determination unit 13, an error detection unit 14, a data cleansing unit 18, an evaluation unit 19, and an analysis result output unit 20. Further, the calculation unit 12 includes a grouping unit 15, an evaluation data generation unit 16, and a degree-of-influence calculation unit 17.

(Acquisition Unit)

The acquisition unit 11 acquires target data D. The target data D is a target of data analysis and is, as an example, data including a plurality of records. Examples of the data including the plurality of records include: structured data such as table data; semi-structured data described in a data description language such as JavaScript Object Notation (JSON) (registered trademark) or Extensible Markup Language (XML); and unstructured data representing a document described in a natural language. As an example, the record is a row of a table and includes a set of one or more attribute names and one or more attribute values corresponding to a column of the table.

In the present example embodiment, the target data D includes a plurality of errors. The errors occur due to various factors including, for example, aggregation error and non-uniform description in different pieces of data. Examples of the errors include different data type (numerical type, character type, date type, and the like) of an attribute value included in a record, duplicate inclusion of the same record in the target data D, inclusion of a missing value in a record, and inclusion of erroneous data in a record.

In a case where the target data D including such an error is analyzed as it is, the accuracy of data analysis is not high, or the result of correct data analysis cannot be obtained. Thus, in a case where the target data D includes an error, the accuracy of analysis can be increased by performing data cleansing.

(Error Detection Unit)

The error detection unit 14 detects a plurality of errors which are included in the target data D. The error detection unit 14 can detect an error by an arbitrary method. As an example, the error detection unit 14 may detect an error included in the target data D by a rule-based detection method or may detect an error by inference using a trained model which has been generated by machine learning.

In the case of the detection of an error by a rule-based detection method, events that the error detection unit 14 determine to be errors may be, for example, the following events: (i) an attribute value is missing; (ii) an attribute value is not within a predetermined range; (iii) an attribute value of a first attribute name and an attribute value of a second attribute name are inconsistent; and (iv) a format of an attribute value is not correct.

In the case of the detection of an error by inference using a trained model, a method for machine learning of the trained model is not limited. As an example, the method may be a decision tree-based method, a method using linear regression, or a method using a neural network. Alternatively, two or more of these methods may be used. As an example, input to the trained model includes a record included in the target data D. As an example, output from the trained model includes a label indicating the presence or absence of an error included in the record or the type of error included in the record.

(Calculation Unit)

The calculation unit 12 calculates, for respective ones of errors included in the target data D or for respective ones of attributes of the errors, corresponding degrees of influence that the respective ones of the errors exert on an evaluation index of an analysis model. Here, the analysis model is a machine learning model corresponding to an analysis task. Examples of the analysis task include, but are not limited to, annual income prediction, sales prediction, morbidity prediction, and the like.

The attribute of the error is an index for classifying an error or information indicating a result of classification of an index. As an example, the attribute of the error includes the type of error, information for identifying each of a plurality of groups into which errors are grouped, and the like. In the case of the grouping of errors into a plurality of groups, grouping may be carried out by type of error, or a plurality of types of errors may be included in one group. In other words, a plurality of types may be associated with one attribute.

(Analysis Model)

The analysis model is a model for analyzing the target data D. As an example, the analysis model is generated by machine learning. As an example, an analysis model $MD_i'$ may be a linear model that performs regression analysis on the prediction of an annual income. A method for machine learning of the analysis model is not limited. As an example, the method may be a decision tree-based method, a method using linear regression, or a method using a neural network. Alternatively, two or more of these methods may be used.

As an example, input to the analysis model includes the target data D. As an example, output from the analysis model includes information indicating an estimation result of an annual income. However, the input to the analysis model and the output from the analysis model are not limited to the above-described examples and may include other information.

(Grouping Unit)

The grouping unit 15 groups the plurality of errors detected by the error detection unit 14, according to the features of the errors. The grouping unit 15 can carry out grouping by an arbitrary method. As an example, the grouping may be carried out by type of error, or a plurality of types of errors may be collected in one group. More specifically, the grouping unit 15, as an example, may carry out grouping by type of method (e.g., rule) by which the error detection unit 14 carries out detection. In addition, as an example, the grouping unit 15 may carry out clustering on a plurality of errors with use of a clustering method such as spectral clustering.

(Evaluation Data Generation Unit)

The evaluation data generation unit 16 generates, for respective ones of errors or for respective ones of attributes of the errors, corresponding pieces of evaluation data $D_i'$ ($i=1, 2, \ldots, n$), each of which is obtained by including a pseudo error in the target data D. Here, n is the number of pieces of evaluation data $D_i'$, and is the number of errors or the number of attributes of errors. In a case where the attributes of the errors and the pieces of evaluation data $D_i'$ correspond to each other in a one-to-one manner, the evaluation data generation unit 16, as an example, generates an error of each attribute in a pseudo manner and includes the generated error in a corresponding piece of evaluation data $D_i'$. Further, in a case where the errors and the evaluation data $D_i'$ correspond to each other in a one-to-one manner, the evaluation data generation unit 16, as an example, generates an error similar to each error in a pseudo manner and includes the similar error in a corresponding piece of evaluation data $D_i'$.

The evaluation data $D_i'$ can be generated by an arbitrary method. As an example, the evaluation data generation unit 16 may generate the evaluation data $D_i'$ by a rule-based generation method such as a method of deleting originally existing data and a method of removing a hyphen. As another example, the evaluation data generation unit 16 may generate the evaluation data $D_i'$ by a generation model of an autoencoder, a generative adversarial network (GAN), or the like. In this case, input to the generation model includes the target data D as an example, and output from the generation model includes the evaluation data $D_i'$ as an example.

(Degree-of-Influence Calculation Unit)

The degree-of-influence calculation unit 17 calculates, for respective ones of errors or for respective ones of attributes of errors, corresponding degrees of influence. More specifically, the degree-of-influence calculation unit 17, as an example, calculates a degree of influence for each of attributes corresponding to groups into which the grouping unit 15 has carried out grouping. In this case, more specifically, the degree-of-influence calculation unit 17, as an example, calculates degrees $s_i$ of influence with use of the pieces of evaluation data $D_i'$.

In a case where the pieces of evaluation data $D_i'$ are used, the degree-of-influence calculation unit 17, as an example, calculates the degrees $s_i$ of influence on the basis of a result of comparison between performance of an analysis model $MD_{init}$ generated with use of the target data D and respective performances of analysis models $MD_i'$ generated with use of the pieces of evaluation data $D_i'$. The degree $s_i$ of influence is, as an example, a value representing a degree of change (e.g., a change rate) in performance of the analysis model. The degree-of-influence calculation unit 17 calculates the degrees $s_i$ of influence for respective ones of n pieces of evaluation data $D_i'$ to thereby obtain n degrees $s_i$ of influence. Hereinafter, assume that the degree S of influence is $S=\{s_1, s_2, \ldots, s_n\}$.

(Determination Unit)

The determination unit 13 determines data to be corrected in the target data D on the basis of the degree S of influence, $S=\{s_1, s_2, \ldots, s_n\}$, calculated by the calculation unit 12. More specifically, the determination unit 13, as an example, calculates, with use of the degrees S of influence calculated by the calculation unit 12, corresponding second degrees of influence that respective ones of a plurality of pieces of partial data included in the target data D exert on the evaluation index, and determines partial data to be corrected on the basis of the calculated second degrees of influence of the respective ones of the pieces of partial data. Here, the partial data is data included in the target data D and is, as an example, a record included in table data including a plurality of records. In other words, in a case where the target data D is table data including a plurality of records, the determination unit 13, as an example, determines a record to be corrected on the basis of the degree S of influence calculated for each type of error.

(Data Cleansing Unit)

The data cleansing unit 18 corrects the data determined by the determination unit 13. The data cleansing unit 18, as an example, may correct the data in accordance with an operation by a user. More specifically, the data cleansing unit 18, for example, may output data targeted for correction to an output apparatus such as a display panel and correct the data on the basis of information input by an input apparatus operated by the user.

Further, the data cleansing unit 18, as an example, may perform data correction by inference based on a trained model which has been obtained by machine learning. In this case, a method for machine learning of the trained model is not limited. As an example, the method may be a decision tree-based method, a method using linear regression, or a method using a neural network. Alternatively, two or more of these methods may be used. Here, input to the trained model includes, as an example, a set of an attribute name and an attribute value in a record including an error. Further, output from the trained model includes, as an example, an attribute value after correction. However, a method by which the data cleansing unit 18 carries out data cleansing is not limited to the example described above and may be other method. For example, the data cleansing unit 18 may carry out rule-based data correction.

(Evaluation Unit)

The evaluation unit 19 generates an analysis model $MD_{clean}$ with use of corrected data $D_{clean}$ which has been obtained through correction of an error(s) by the data cleansing unit 18, and evaluates the performance of the generated analysis model $MD_{clean}$. Here, the evaluation unit 19 stops a sequential determination process in a case where a result of the evaluation on the corrected data $D_{clean}$, which has been obtained through correction of an error(s) by the data cleansing unit 18, with use of the analysis model MD satisfies a predetermined condition. As an example, the predetermined condition is a condition that a mean square error (MSE) of prediction values indicating prediction results by the analysis model $MD_{clean}$ is less than a predetermined threshold value. The determination unit 13 and the evaluation unit 19 are examples of the determination means in accordance with the present specification.

(Analysis Result Output Unit)

The analysis result output unit 20 outputs information indicating an analysis result. As an example, the information indicating the analysis result includes at least one selected from the group consisting of the corrected data $D_{clean}$ and the analysis model $MD_{clean}$. Further, the information indicating the analysis result may include at least one selected from the group consisting of the degree S of influence calculated by the calculation unit 12 and the second degrees of influence of the pieces of partial data. The analysis result output unit 20 may output the information by transmitting the information indicating the analysis result to another apparatus connected via the communication unit 40A or may output the information to an output apparatus connected via the input/output unit 30A. Further, the analysis result output unit 20 may output the information by writing the information to the storage unit 20A or another external storage apparatus.

(Storage Unit)

The storage unit 20A stores the target data D, the evaluation data $D_1', D_2', \ldots, D_n'$, the corrected data $D_{clean}$, the analysis model $MD_{init}$, the analysis models $MD_1', MD_2', \ldots, MD_n'$, and the analysis model $MD_{clean}$. Hereinafter, the analysis model MD, the analysis models $MD_1', MD_2', \ldots, MD_n'$, and the analysis model $MD_{clean}$ will also referred to simply as "analysis model MD" if there is no need to distinguish these analysis models from each other. Here, the expression "the analysis model MD is stored in the storage unit 20A" means that the parameters defining the analysis model MD are stored in the storage unit 20A.

<Flow of Information Processing Method>

Figure 4:
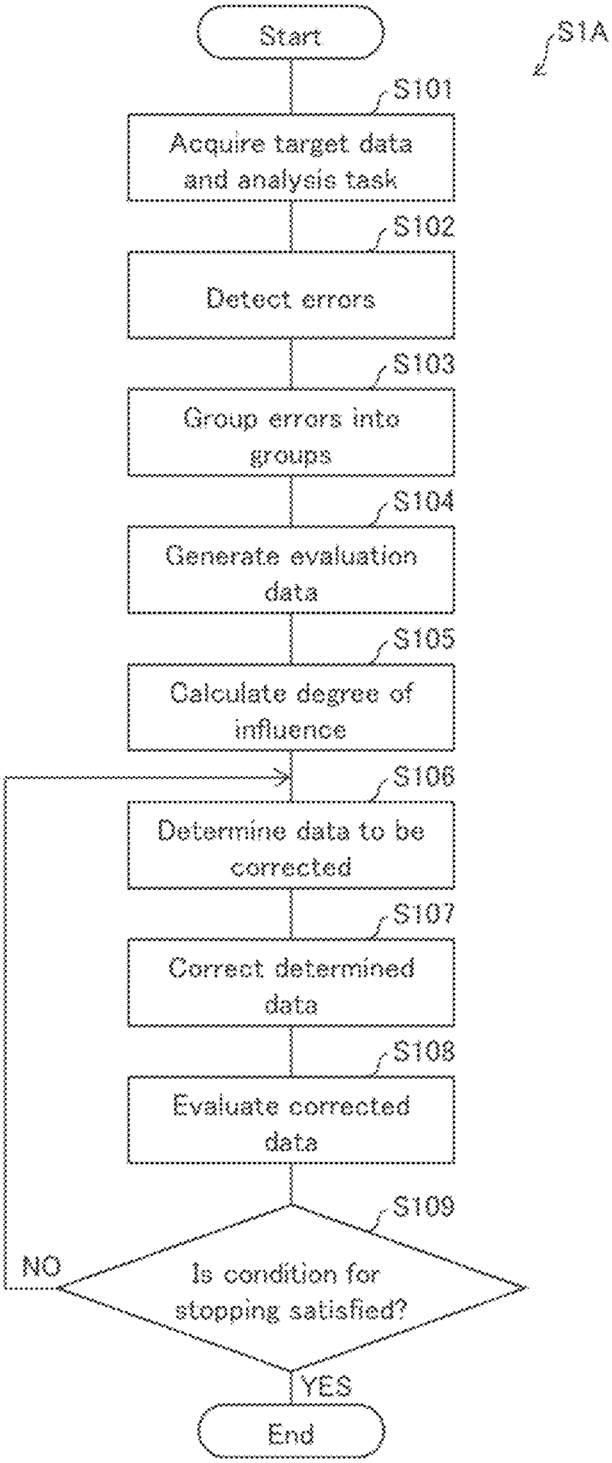
FIG. 4 is a flowchart illustrating a flow of an information processing method in accordance with the second example embodiment.

A flow of an information processing method S1A, which is an example of an information processing method in accordance with the second example embodiment, will be described with reference to FIG. 4. FIG. 4 is a flowchart illustrating the flow of the information processing method S1A.

(Step S101)

In step S101, the acquisition unit 11 acquires target data D and an analysis task. In this example, the target data D includes training data $D_{train}$ used for generation of an analysis model and test data $D_{test}$ for evaluating the performance of the analysis model. The acquisition unit 11 may receive the target data D and the analysis task from another apparatus via the communication unit 40A or may acquire the target data D and the analysis task from an input apparatus connected via the input/output unit 30A. Further, the acquisition unit 11 may acquire the target data D and the analysis task by reading the target data D and the analysis task from the storage unit 20A or another external storage apparatus.

(Step S102)

In step S102, the error detection unit 14 detects a plurality of errors which are included in the target data D and outputs error indexes indicating the respective locations of the errors. As an example, the error detection unit 14 detects an error by a rule-based detection method. Alternatively, the error detection unit 14 may detect an error by inference using a trained model which has been generated by machine learning.

FIG. 5 is a view illustrating a specific example of the errors detected by the error detection unit 14. In the example of FIG. 5, events that the error detection unit 14 determine to be errors are, for example, the following events: an attribute value is missing; an attribute value of a predetermined attribute name is not within a predetermined range; an attribute value of a first attribute name and an attribute value of a second attribute name are inconsistent; and a format of an attribute value of a predetermined attribute name is not correct. In the example of FIG. 5, the error detection unit 14 detects errors E1 to E5 in the target data D.

(Step S103)

In step S103, the grouping unit 15 groups the plurality of errors detected by the error detection unit 14 into a plurality of groups and outputs a set of error groups, $G=\{g_1, g_2, \ldots, g_n\}$.

FIG. 6 is a view illustrating a specific example of the grouping by the grouping unit 15. In the example of FIG. 6, the grouping unit 15 classifies the plurality of errors E1 to E5 into the following four groups: a group $g_1$ of missing values; a group $g_2$ of format errors; a group $g_3$ of inconsistencies; and a group $g_4$ of outlier values.

(Step S104)

In step S104, the evaluation data generation unit 16 increases corresponding errors similar to the respective ones of errors belonging to the respective ones of the groups $g_1, g_2, \ldots, g_n$, to thereby generate new pieces of evaluation data $D_i'$.

FIG. 7 is a view illustrating a specific example of the evaluation data $D_i'$. In the example of FIG. 7, the evaluation data generation unit 16 replaces a part of attribute values in a record included in the target data D with a missing value E11 to thereby generate the evaluation data $D_1'$ corresponding to the group $g_1$ of missing values. Further, the evaluation data generation unit 16 replaces an attribute value of a "postal code" in a record included in the target data D with an attribute value E12 which is obtained by deleting a hyphen to thereby generate the evaluation data $D_2'$ corresponding to the group $g_2$ of format errors.

(Step S105)

In step S105, the degree-of-influence calculation unit 17 generates an analysis model $MD_i'$ with use of each of the n pieces of evaluation data $D_i'$ as training data and evaluates the generated analysis model $MD_i'$. In the present operation example, the analysis model $MD_i'$ and the analysis model $MD_{init}$ are models each corresponding to the analysis task which has been acquired by the acquisition unit 11 in step S101, and these models are generated by a common generation method that supports analysis tasks.

As an example, the degree-of-influence calculation unit 17 evaluates the generated analysis model $MD_i'$ with use of a function eval( ) for evaluating an analysis model. Here, the function eval( ) is a function that receives an analysis model as input and outputs a score for evaluating the performance of the analysis model. In other words, in this case, the degree $s_i$ of influence is calculated by $s_i=\text{eval}(MD_i')$. A performance evaluation index for analysis can be any index. As an example, at the above-described regression analysis, a mean square error (MSE) may be calculated. Alternatively, a difference from an MSE calculated for the target data D, which is the original data, may be calculated.

Figures 8, 9:
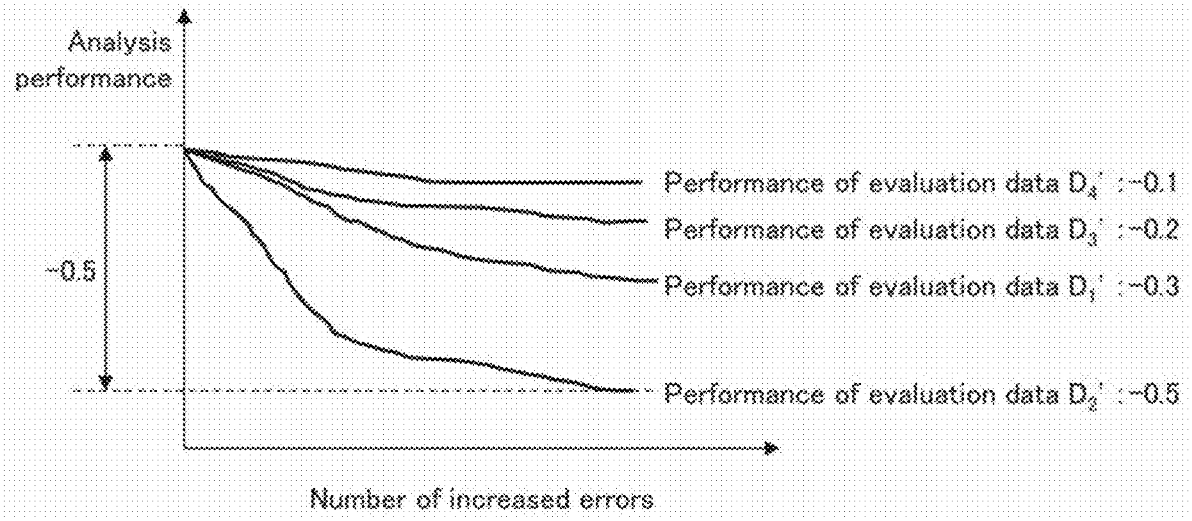
FIG. 8 is a view illustrating a specific example of the degree of influence calculated by a degree-of-influence calculation unit in accordance with the second example embodiment.
FIG. 9 is a view illustrating a specific example of a determination process carried out by a determination unit in accordance with the second example embodiment.

FIG. 8 is a view for describing a specific example of the degree $s_i$ of influence calculated by the degree-of-influence calculation unit 17. In the example of FIG. 8, the horizontal axis indicates the number of increased errors, and the vertical axis indicates analysis performance of an analysis model. In the example of FIG. 8, the analysis model $MD_4'$ generated with use of the evaluation data $D_4'$ is decreased in performance by 0.1 with respect to the analysis model $MD_{init}$ generated with use of the target data D, which is the original data. Further, the analysis model $MD_3'$ generated with use of the evaluation data $D_3'$ is decreased in performance by 0.2 with respect to the analysis model $MD_{init}$. Further, the analysis model $MD_1'$ generated with use of the evaluation data $D_1'$ is decreased in performance by 0.3 with respect to the analysis model $MD_{init}$. Further, the analysis model $MD_2'$ generated with use of the evaluation data $D_2'$ is decreased in performance by 0.5 with respect to the analysis model $MD_{init}$. In the example of FIG. 8, as an example, the degree-of-influence calculation unit 17 calculates, as the degree of influence, the amount of decrease in the performance of the analysis model $MD_i'$ with respect to the analysis model $MD_{init}$.

(Step S106)

In step S106, the determination unit 13 determines data to be corrected with use of the degree of influence $S=\{s_1, s_2, \ldots, s_n\}$, which is a set of n evaluation results (degree $s_i$ of influence). In this example, input to the determination unit 13 includes the target data D and the degree S of influence. Output from the determination unit 13 includes a priority order I for data record correction. In other words, in the present operation example, the determination unit 13 determines the priority order of the data to be corrected on the basis of the degree S of influence.

Data to be corrected can be selected by an arbitrary method. As an example, the determination unit 13 calculates, with use of the degrees S of influence calculated by the calculation unit 12, corresponding second degrees of influence that respective ones of a plurality of records included in the target data D exert on the evaluation index, and determines data to be corrected on the basis of the calculated second degrees of influence of the respective ones of the records.

FIG. 9 is a view illustrating a specific example of the determination process carried out by the determination unit 13. In the example of FIG. 9, the target data D includes records r1 to r3. In the example of FIG. 9, the sum of the degrees $s_i$ of influence corresponding to attributes of errors included in each record is calculated as the second degree of influence of each record.

In the example of FIG. 9, in a case where the degree of influence of the group g1 is "0.3", the degree of influence of the group g2 is "0.2", the degree of influence of the group g3 is "0.5", and the degree of influence of the group g4 is "0.1", the second degrees of influence of the records r1 to r3 become values as below. The record r1 includes two errors of the group g2. Thus, the second degree of influence of the record r1 is 0.5+0.5=1. The record r2 includes one error of the group g1 and one error of the group g4. Thus, the second influence degree of the record r2 is 0.3+0.1=0.4. The record r3 includes one error of the group g3. Thus, the second degree of influence of the record r3 is 0.2. In the example of FIG. 9, the determination unit 13 determines a record the second degree of influence of which is high to be a record to be corrected.

(Step S107)

In step S107, the data cleansing unit 18 corrects the data which has been determined in step S106. Here, as an example, input to the data cleansing unit 18 includes the target data D and the priority order I, which is the order of priorities of the records to be corrected. As an example, output from the data cleansing unit 18 includes corrected data $D_{clean}$ which has been obtained through correction of a record targeted for correction in the target data D.

In step S107, the number of records to be corrected at a time by the data cleansing unit 18 may be set in advance. In this case, the data cleansing unit 18 selects a preset number of records from among a plurality of records targeted for correction on the basis of the priority order I and corrects the selected record(s).

The data cleansing unit 18 can correct data by an arbitrary method. As an example, the data cleansing unit 18 may output, to a display, a screen for a user to correct data and correct the data according to the content of an operation by the user. In addition, the data cleansing unit 18 may correct data targeted for correction by a rule-based correction method. Alternatively, the data cleansing unit 18 may correct data by inference using a trained model which has been generated by machine learning.

Figures 10, 11:
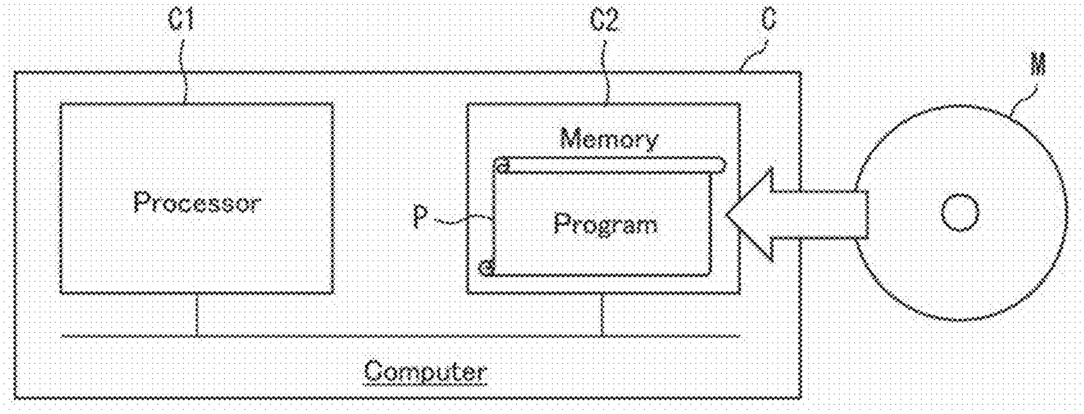
FIG. 10 is a view illustrating a specific example of a data correction process carried out by a data cleansing unit in accordance with the second example embodiment.
FIG. 11 is a diagram illustrating an example of a computer that executes instructions of a program which is software realizing functions of apparatuses in accordance with the example embodiments.

FIG. 10 is a view illustrating a specific example of a data correction process carried out by the data cleansing unit 18. In the example of FIG. 10, the data cleansing unit 18 corrects an attribute value of the "age" and an attribute value of the "annual income" in the record r1 included in the target data D. The corrected data $D_{clean}$ includes a corrected record $r1_{clean}$ which has been obtained through correction of the record r1.

(Step S108)

In step S108, the evaluation unit 19 generates an analysis model $MD_{clean}$ with use of the corrected data $D_{clean}$, and evaluates the performance of the generated analysis model $MD_{clean}$. The evaluation unit 19 can make evaluation by an arbitrary method. As an example, the evaluation unit 19 may perform regression analysis on the prediction of an annual income by a linear model with respect to an annual income prediction task and evaluate an analysis result by a mean square error (MSE) of prediction values.

(Step S109)

In step S109, the evaluation unit 19 determines whether an evaluation result satisfies a predetermined condition for stopping. As an example, the condition for stopping is a condition that an MSE (prediction error) is less than 0.2. In a case where the evaluation result satisfies the condition for stopping (YES in step S109), the evaluation unit 19 ends the process. On the other hand, in a case where the evaluation result does not satisfy the condition for stopping (NO in step S109), the evaluation unit 19 returns to the process in step S106 and continues the data correction process.

In other words, in steps S106 to S109, the determination unit 13 sequentially determines data to be corrected with reference to the above-described priority order, and the evaluation unit 19 stops the above-described sequential determination process in a case where the evaluation result of the corrected data $D_{clean}$ which has been obtained through correction of the data determined by the determination unit 13 in the target data D satisfies a predetermined target value.

Example Advantages Information Processing Apparatus

In the case of large-scale data, it is not realistic to carry out data analysis after all errors have been corrected. This is because correcting all errors included in large-scale data requires an enormous amount of time and enormous cost. In contrast, in the present example embodiment, it is possible to achieve more accurate data analysis while reducing the cost by preferentially cleansing an error which has a large influence on an analysis task.

In addition, in the conventional data cleansing technology, there is a problem that a correctable error and an applicable machine learning model are limited. In addition, it is known that an error to be corrected differs depending on the type of analysis task in machine learning, and error correction allowing for an analysis task cannot be carried out. In contrast, according to the information processing apparatus 1A in accordance with the present example embodiment, the degree of influence based on a machine learning model (that is, an analysis task) is calculated for each type of error, and data to be corrected is determined. Thus, the present invention provides an example advantage of enabling error correction allowing for an analysis task in an arbitrary machine learning model regardless of the type of error.

In addition, the information processing apparatus 1A in accordance with the present example embodiment employs the configuration in which the calculation unit 12 calculates the degree $s_i$ of influence for each of attributes corresponding to groups into which the plurality of errors are grouped according to the features of the errors. Thus, the information processing apparatus 1A in accordance with the present example embodiment makes it possible to determine data to be corrected in consideration of the degree of influence of each of groups obtained by carrying out grouping according to features of the errors.

In addition, the information processing apparatus 1A in accordance with the present example embodiment employs the configuration in which the calculation unit 12 generates, for respective ones of the errors or for respective ones of attributes of the errors, corresponding pieces of evaluation data $D_1'$, $D_2'$, . . . , $D_n'$, each of which is obtained by including a pseudo error in the target data D, and calculates the degrees S of influence with use of the generated pieces of evaluation data $D_1'$, $D_2'$, . . . , $D_n'$. Thus, the information processing apparatus 1A in accordance with the present example embodiment calculates the degrees of influence with use of the corresponding pieces of evaluation data generated for respective ones of errors or for respective ones of attributes of the errors, and thus makes it possible to more accurately determine data to be corrected.

In addition, the information processing apparatus 1A in accordance with the present example embodiment employs the configuration in which the calculation unit 12 calculates the degree of influence $S=\{s_1, s_2, \ldots, s_n\}$ on the basis of a result of comparison between the performance of an analysis model MD generated with use of the target data D and the performance of each of analysis models $MD_1'$, $MD_2'$, . . . , $MD_n'$ generated respectively with use of the evaluation data $D_1'$, $D_2'$, . . . , $D_n'$. Thus, the information processing apparatus 1A in accordance with the present example embodiment calculates the degree of influence on the basis of a change in the performance of an analysis model generated with use of evaluation data which includes a pseudo error, and thus makes it possible to more accurately determine data to be corrected.

In addition, the information processing apparatus 1A in accordance with the present example embodiment employs the configuration in which the determination unit 13 calculates, with use of the degrees S of influence calculated by the calculation unit 12, corresponding second degrees of influence that respective ones of a plurality of records included in the target data D exert on the evaluation index, and determines a record to be corrected on the basis of the calculated second degrees of influence of the respective ones of the records. Thus, the information processing apparatus 1 in accordance with the present example embodiment makes it possible to more suitably select a record to be corrected from among a plurality of records.

In addition, the information processing apparatus 1A in accordance with the present example embodiment employs the configuration in which the determination unit 13 determines the priority order of the data to be corrected on the basis of the degree S of influence. Thus, the information processing apparatus 1A in accordance with the present example embodiment determines the priority order of the data to be corrected on the basis of the degrees of influence of errors, and thus makes it possible to more suitably determine the priority order.

In addition, the information processing apparatus 1A in accordance with the present example embodiment employs the configuration in which the determination unit 13 sequentially determines the data to be corrected with reference to the above-described priority order. Thus, the information processing apparatus 1A in accordance with the present example embodiment makes it possible to more accurately carry out a process of sequentially determining data to be corrected.

In addition, the information processing apparatus 1A in accordance with the present example embodiment employs the configuration in which the determination unit 13 stops a sequential determination process in a case where an evaluation result of corrected data $D_{clean}$ which has been obtained through correction of the determined data satisfies a predetermined target value. Repeatedly carrying out cleansing until a condition for stopping is satisfied provides an example advantage of making it possible to make the accuracy of data analysis at a fixed cost higher than before and making it possible to make the cost for achieving a certain accuracy target lower than before. As described above, according to the present example embodiment, it is possible to achieve data cleansing by which the quality of target data satisfies a predetermined target value while suppressing a processing load related to data cleansing.

Software Implementation Example

Some or all of functions of the information processing apparatuses 1 and 1A can be realized by hardware such as an integrated circuit (IC chip) or can be alternatively realized by software.

In the latter case, the information processing apparatuses 1 and 1A are each realized by, for example, a computer that executes instructions of a program that is software realizing the foregoing functions. FIG. 11 illustrates an example of such a computer (hereinafter referred to as "computer C"). The computer C includes at least one processor C1 and at least one memory C2. The at least one memory C2 stores a program P for causing the computer C to operate as each of the information processing apparatuses 1 and 1A. In the computer C, the processor C1 reads the program P from the memory C2 and executes the program P, so that the functions of the information processing apparatuses 1 and 1A are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. As the memory C2, for example, it is possible to use a flash memory, a hard disk drive (HDD), a solid state drive (SSD), or a combination of these.

Note that the computer C can further include a random access memory (RAM) in which the program P is loaded at the execution of the program P and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some of or all of the foregoing example embodiments can also be described as below. Note, however, that the present invention is not limited to the following example aspects.

[Supplementary Note 1]

An information processing apparatus including: an acquisition means for acquiring target data; a calculation means for calculating, for respective ones of a plurality of errors included in the target data or for respective ones of attributes of the plurality of errors, corresponding degrees of influence that the respective ones of the plurality of errors exert on an evaluation index of a machine learning model; and a determination means for determining data to be corrected in the target data on the basis of the degrees of influence calculated by the calculation means.

[Supplementary Note 2]

The information processing apparatus described in supplementary note 1, wherein the calculation means is configured to calculate the degrees of influence for the respective ones of attributes corresponding to groups into which the plurality of errors are grouped according to features of the errors.

[Supplementary Note 3]

The information processing apparatus described in supplementary note 1 or 2, wherein the calculation means is configured to generate, for the respective ones of the errors or for the respective ones of the attributes of the errors, corresponding pieces of evaluation data each of which is obtained by including a pseudo error in the target data and calculate the degrees of influence with use of the generated pieces of evaluation data.

[Supplementary Note 4]

The information processing apparatus described in supplementary note 3, wherein the calculation means is configured to calculate the degrees of influence on the basis of a result of comparison between performance of a machine learning model generated with use of the target data and learning models respective performances of machine generated with use of the pieces of evaluation data.

[Supplementary Note 5]

The information processing apparatus described in any one of supplementary notes 1 to 4, wherein the determination means is configured to calculate, with use of the degrees of influence calculated by the calculation means, corresponding second degrees of influence that respective ones of a plurality of pieces of partial data included in the target data exert on the evaluation index and determine partial data to be corrected on the basis of the calculated second degrees of influence of the respective ones of the pieces of partial data.

[Supplementary Note 6]

The information processing apparatus described in any one of supplementary notes 1 to 5, wherein the determination means is configured to determine, on the basis of the degrees of influence, a priority order of data to be corrected.

[Supplementary Note 7]

The information processing apparatus described in supplementary note 6, wherein the determination means is configured to sequentially determine the data to be corrected with reference to the priority order.

[Supplementary Note 8]

The information processing apparatus described in supplementary note 7, wherein the determination means is configured to stop a sequential determination process in a case where an evaluation result of corrected data which has been obtained through correction of the determined data satisfies a predetermined target value.

[Supplementary Note 9]

An information processing method including: at least one processor acquiring target data; the at least one processor calculating, for respective ones of a plurality of errors included in the target data or for respective ones of attributes of the plurality of errors, corresponding degrees of influence that the respective ones of the plurality of errors exert on an evaluation index of a machine learning model; and the at least one processor determining data to be corrected in the target data on the basis of the calculated degrees of influence.

[Supplementary Note 10]

A program for causing a computer to function as: an acquisition means for acquiring target data; a calculation means for calculating, for respective ones of a plurality of errors included in the target data or for respective ones of attributes of the plurality of errors, corresponding degrees of influence that the respective ones of the plurality of errors exert on an evaluation index of a machine learning model; and a determination means for determining data to be corrected in the target data on the basis of the degrees of influence calculated by the calculation means.

[Additional Remark 3]

Furthermore, some of or all of the foregoing example embodiments can also be described as below.

An information processing apparatus including at least one processor, the at least one processor carrying out: an acquisition process for acquiring target data; a calculation process for calculating, for respective ones of a plurality of errors included in the target data or for respective ones of attributes of the plurality of errors, corresponding degrees of influence that the respective ones of the plurality of errors exert on an evaluation index of a machine learning model; and a determination process for determining data to be corrected in the target data on the basis of the degrees of influence calculated in the calculation process.

Note that the information processing apparatus can further include a memory. The memory can store a program for causing the processor to execute the acquisition process, the calculation process, and the determination process. The program can be stored in a computer-readable non-transitory tangible storage medium.

REFERENCE SIGNS LIST

1, 1A: information processing apparatus
11: acquisition unit
12: calculation unit
13: determination unit

What is claimed is:

1. A correction data determination apparatus comprising:
- at least one processor, the at least one processor carrying out:
  - an acquisition process for acquiring target data;
  - a calculation process for calculating, for respective ones of a plurality of errors included in the target data or for respective ones of attributes of the plurality of errors, corresponding degrees of influence that the respective ones of the plurality of errors or the respective ones of the attribute exert on an evaluation index of a machine learning model; wherein the calculation process includes:
    - generating, for each of the respective ones of the plurality of errors or the respective ones of the attributes, evaluation data obtained by including a pseudo error corresponding to the error or the attribute in the target data; and
    - calculating the degree of influence corresponding to the error or the attribute on the basis of a comparison between performance of a machine learning model generated with use of the target data and performance of a machine learning model generated with use of the evaluation data;
  - a determination process for determining data to be corrected in the target data on the basis of the degrees of influence calculated in the calculation process, wherein the determination process includes determining, from among pieces of data included in the target data, the data to be corrected in accordance with one or more errors or one or more attributes of one or more errors included in the pieces of data and the degrees of influence corresponding to the one or more errors or the one or more attributes; and
  - a data cleansing process for correcting the data that has been determined to be corrected in the target data.

2. The correction data determination apparatus according to claim 1, wherein
- in the calculation process, the at least one processor is configured to calculate the degrees of influence for the respective ones of attributes corresponding to groups into which the plurality of errors are grouped according to features of the errors.

3. The correction data determination apparatus according to claim 1, wherein in the calculation process, the at least one processor is configured to generate, for the respective ones of the errors or for the respective ones of the attributes of the errors, corresponding pieces of evaluation data each of which is obtained by including a pseudo error in the target data and calculate the degrees of influence with use of the generated pieces of evaluation data.

4. The correction data determination apparatus according to claim 3, wherein in the calculation process, the at least one processor is configured to calculate the degrees of influence on the basis of a result of comparison between performance of a machine learning model generated with use of the target data and respective performances of machine learning models generated with use of the pieces of evaluation data.

5. The correction data determination apparatus according to claim 1, wherein in the determination process, the at least one processor is configured to calculate, with use of the degrees of influence calculated in the calculation process, corresponding second degrees of influence that respective ones of a plurality of pieces of partial data included in the target data exert on the evaluation index and determine partial data to be corrected on the basis of the calculated second degrees of influence of the respective ones of the pieces of partial data.

6. The correction data determination apparatus according to claim 1, wherein in the determination process, the at least one processor is configured to determine, on the basis of the degrees of influence, a priority order of data to be corrected.

7. The correction data determination apparatus according to claim 6, wherein in the determination process, the at least one processor is configured to sequentially determine the data to be corrected with reference to the priority order.

8. The correction data determination apparatus according to claim 7, wherein in the determination process, the at least one processor is configured to stop a sequential determination process in a case where an evaluation result of corrected data which has been obtained through correction of the determined data satisfies a predetermined target value.

9. A correction data determination method comprising:

at least one processor acquiring target data;

the at least one processor calculating, for respective ones of a plurality of errors included in the target data or for respective ones of attributes of the plurality of errors, corresponding degrees of influence that the respective ones of the plurality of errors or the respective ones of the attribute exert on an evaluation index of a machine learning model, wherein calculating the corresponding degrees of influence includes:

generating, for each of the respective ones of the plurality of errors or the respective ones of the attributes, evaluation data obtained by including a pseudo error corresponding to the error or the attribute in the target data; and calculating the degree of influence corresponding to the error or the attribute on the basis of a comparison between performance of a machine learning model generated with use of the target data and performance of a machine learning model generated with use of the evaluation data;

the at least one processor determining data to be corrected in the target data on the basis of the calculated degrees of influence, wherein determining the data to be corrected in the target data includes determining, from among pieces of data included in the target data, the data to be corrected in accordance with one or more errors or one or more attributes of one or more errors included in the pieces of data and the degrees of influence corresponding to the one or more errors or the one or more attributes; and the at least one processor correcting the data that has been determined to be corrected in the target data.

10. A computer-readable non-transitory storage medium storing a program for causing a computer to function as a correction data determination apparatus, the program causing the computer to carry out:

an acquisition process for acquiring target data;

a calculation process for calculating, for respective ones of a plurality of errors included in the target data or for respective ones of attributes of the plurality of errors, corresponding degrees of influence that the respective ones of the plurality of errors or the respective ones of the attribute exert on an evaluation index of a machine learning model, wherein the calculation process includes:

generating, for each of the respective ones of the plurality of errors or the respective ones of the attributes, evaluation data obtained by including a pseudo error corresponding to the error or the attribute in the target data; and calculating the degree of influence corresponding to the error or the attribute on the basis of a comparison between performance of a machine learning model generated with use of the target data and performance of a machine learning model generated with use of the evaluation data;

a determination process for determining data to be corrected in the target data on the basis of the degrees of influence calculated in the calculation process, wherein the determination process includes determining, from among pieces of data included in the target data, the data to be corrected in accordance with one or more errors or one or more attributes of one or more errors included in the pieces of data and the degrees of influence corresponding to the one or more errors or the one or more attributes; and a data cleansing process for correcting the data that has been determined to be corrected in the target data.

* * * * *